United States Patent
Oe et al.

(10) Patent No.: US 11,508,161 B2
(45) Date of Patent: Nov. 22, 2022

(54) DRIVING SUPPORT SYSTEM AND SERVER DEVICE

(71) Applicant: TOYOTA JIDOSHA KABUSHIKI KAISHA, Toyota (JP)

(72) Inventors: Yoshihiro Oe, Kawasaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 16/706,898

(22) Filed: Dec. 9, 2019

(65) Prior Publication Data

US 2020/0265250 A1 Aug. 20, 2020

(30) Foreign Application Priority Data

Feb. 18, 2019 (JP) .............................. JP2019-026866

(51) Int. Cl.
*G06V 20/58* (2022.01)
*G05D 1/02* (2020.01)

(52) U.S. Cl.
CPC .......... *G06V 20/584* (2022.01); *G05D 1/0246* (2013.01); *G06V 20/582* (2022.01)

(58) Field of Classification Search
CPC ........... G06K 9/00825; G06K 9/00818; G05D 1/0246; H04W 4/40; G08G 1/09623; G08G 1/09626; G08G 1/123; B60W 30/18154; B60W 2556/50; B60W 2050/143; B60W 2555/60; G01C 21/3602
See application file for complete search history.

(56) References Cited

U.S. PATENT DOCUMENTS

| | | | |
|---|---|---|---|
| 2009/0303077 A1* | 12/2009 | Onome | G08G 1/096716 340/901 |
| 2013/0033603 A1 | 2/2013 | Suzuki et al. | |
| 2015/0019128 A1* | 1/2015 | Weiland | B60W 50/14 701/437 |
| 2016/0305794 A1* | 10/2016 | Horita | G06K 9/00825 |
| 2017/0262709 A1* | 9/2017 | Wellington | G06K 9/6201 |
| 2018/0137377 A1* | 5/2018 | Nishida | G08G 1/0129 |
| 2019/0171891 A1* | 6/2019 | Ferguson | B60W 40/00 |
| 2019/0244801 A1* | 8/2019 | Fujita | H01J 49/0086 |
| 2019/0282004 A1* | 9/2019 | Schwartz | A47G 9/0207 |

FOREIGN PATENT DOCUMENTS

| | | | | |
|---|---|---|---|---|
| EP | 2541208 A2 * | 1/2013 | | G01C 21/3644 |
| JP | 2011-108175 A | 6/2011 | | |
| JP | 2015-146076 A | 8/2015 | | |
| JP | 2016-112984 A | 6/2016 | | |
| JP | 2018-005827 A | 1/2018 | | |
| WO | 2011/108052 A1 | 9/2011 | | |

\* cited by examiner

*Primary Examiner* — Kenneth J Malkowski
(74) *Attorney, Agent, or Firm* — Oliff PLC (57) ABSTRACT

A driving support system includes: an acquisition portion configured to acquire visual-recognition position information on a position where a driver of a vehicle visually recognizes a traffic light; an image acquisition portion configured to acquire a forward image ahead of the vehicle; a traffic-light recognition portion configured to recognize a traffic light included in a forward image; and a notification portion configured to notify the driver of warning when the traffic light is not recognized from the forward image, in a case where the vehicle is present at a position based on the visual-recognition position information.

4 Claims, 6 Drawing Sheets

DRIVING SUPPORT SYSTEM AND SERVER DEVICE

INCORPORATION BY REFERENCE

The disclosure of Japanese Patent Application No. 2019-026866 filed on Feb. 18, 2019 including the specification, drawings and abstract is incorporated herein by reference in its entirety.

BACKGROUND

1. Technical Field

The present disclosure relates to a driving support system and a server device.

2. Description of Related Art

Japanese Unexamined Patent Application Publication No. 2018-5827 (JP 2018-5827 A) describes a driving support system configured to execute lane-changing without any burden on a driver. More specifically, JP 2018-5827 describes a technique in which a state of a host vehicle to be obtained if lane-changing is performed is predicted in advance, and when it is determined that it is difficult to visually recognize a traffic light, based on the height of the traffic light, the size of a forward vehicle, or the like, the driver is warned to promote cancellation of the lane-changing.

SUMMARY

However, even when visual recognizability is calculated only based on the height of the traffic light, it is not always possible to perform the prediction with high accuracy. For example, in a case where the vehicle travels on a three-dimensional road, even if the height of a traffic light is the same, the visibility of the traffic light changes depending on a traveling position.

Further, the difficulty in visual recognition of a traffic light also occurs in cases other than lane-changing. In a case where a road winds or a road changes in height like a mountain area, in a case where a large-size vehicle temporarily travels ahead of a host vehicle, or in a case where a power line or the like is under construction, the field of view ahead of the host vehicle decreases, so that it might become difficult to visually recognize a traffic light.

In view of this, an object of the present disclosure is to provide a driving support system and a server device each of which can accurately grasp a position where a traffic light is visually recognizable and accurately notify a driver or the like that a traffic light that should be visually recognizable originally is not visually recognizable.

This disclosure relates to a driving support system. The driving support system includes an acquisition portion, an image acquisition portion, a traffic-light recognition portion, and a notification portion. The acquisition portion is configured to acquire visual-recognition position information on a position where a driver of a vehicle visually recognizes a traffic light. The image acquisition portion is configured to acquire a forward image ahead of the vehicle. The traffic-light recognition portion is configured to recognize a traffic light included in the forward image. The notification portion is configured to notify the driver of warning when the traffic light is not recognized from the forward image, in a case where the vehicle is present at a position based on the visual-recognition position information.

The driving support system may further include an output portion configured to output, to an outer part, route information on a route where the vehicle is planned to travel; and a second acquisition portion configured to acquire pieces of visual-recognition position information of a plurality of traffic lights on the route indicated by the route information. Further, the driving support system may further include a second output portion configured to output, to an outer part, position information on a position of the vehicle where the traffic light is recognized by the traffic-light recognition portion. Further, the present disclosure may be applied to a road sign instead of the traffic light.

Here, the visual-recognition position information may be latitude information and longitude information indicative of a position where the traffic light is visually recognizable, or the visual-recognition position information may be relative position information based on a predetermined intersection or the like. Further, the visual-recognition position information may be information indicating that a present vehicle position is a visual-recognition position where the traffic light is visually recognizable. In this case, information to be received may be information of one bit. In the driving support system, when this information is received, position information of the vehicle at that time can be acquired as the position where the traffic light is visually recognizable.

Further, this disclosure provides a server device. The server device includes an acquisition portion and a receiving portion. The acquisition portion is configured to acquire, from a plurality of vehicles, pieces of visual-recognition position information on respective positions where drivers of the vehicles visually recognize a traffic light. The receiving portion is configured to receive, from the vehicles, pieces of position information on respective positions of the vehicles where the traffic light is recognized.

More specifically, the server device may transmit visual-recognition position information to the vehicle. Note that the server device may acquire vehicle-type information of the vehicle and transmit, to the vehicle, visual-recognition position information corrected in accordance with the vehicle type. Further, the server device may calculate the visual-recognition position information based on the pieces of position information of the vehicles that are received from the vehicles. Note that the server device may be associated with a predetermined traffic light and placed under a road surface or the like near the traffic light. Accordingly, a plurality of traffic lights may be provided such that respective server devices are provided to the traffic lights. In this case, transmission and reception of information may be performed between the vehicle and the server device by road-to-vehicle communication.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

The following describes embodiments of the present disclosure with reference to the drawings. The following embodiments are examples to describe the present disclosure and are not intended to limit a scope of the present disclosure to the embodiments.

Figure 1:
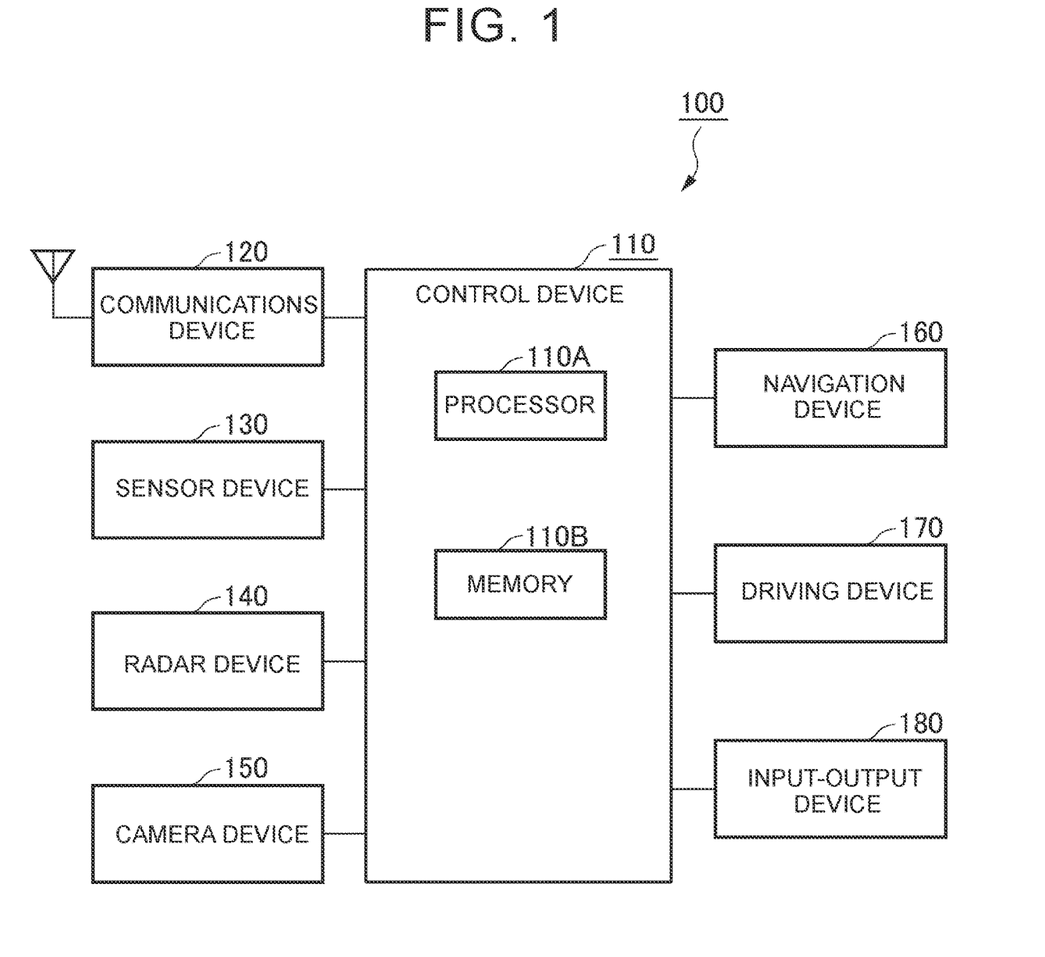
FIG. 1 is a block diagram illustrating a schematic hardware configuration of a vehicle 100.
Figure 2:
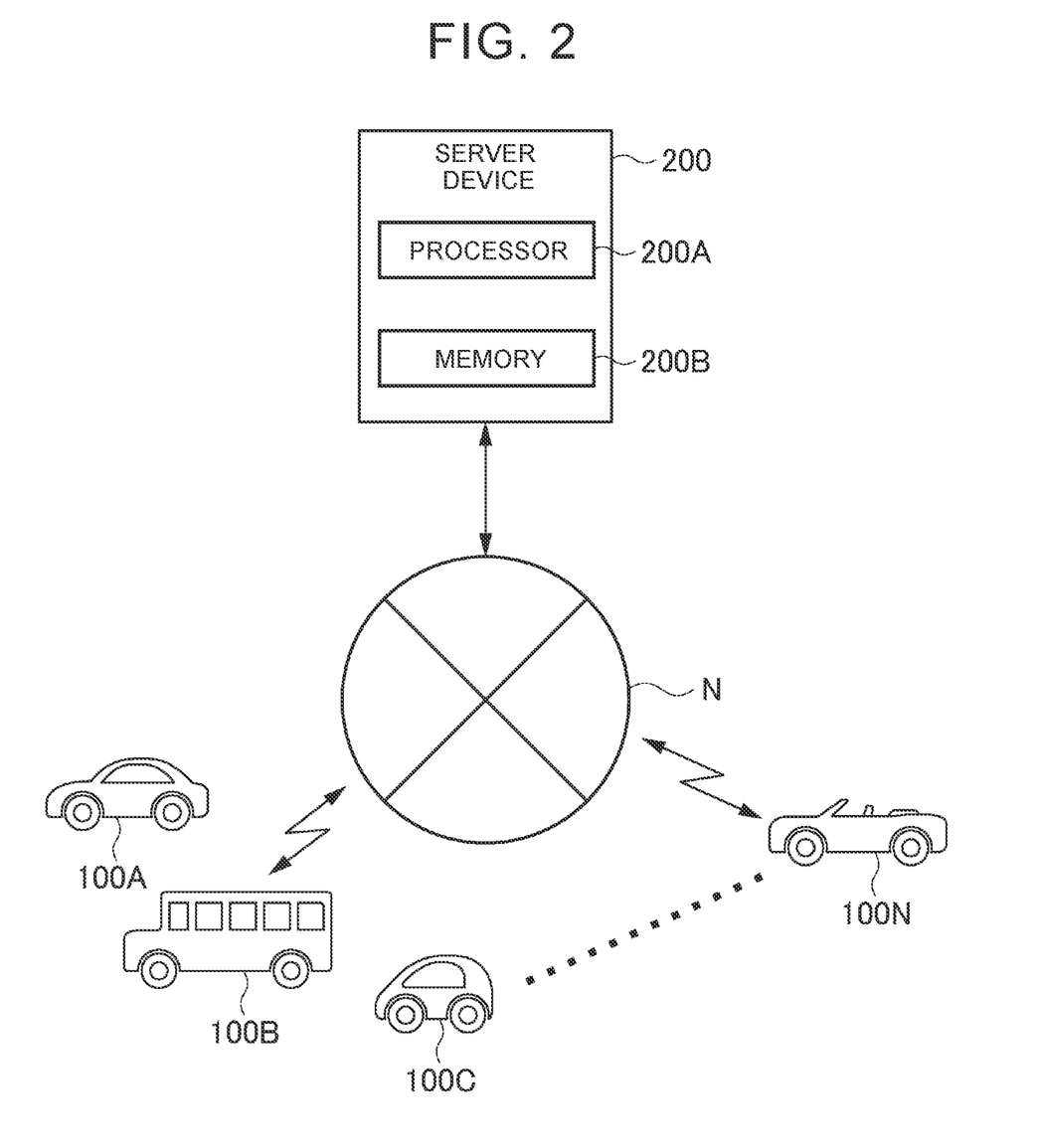
FIG. 2 is a schematic view of a server device 200 and a plurality of vehicles 100 communicable with the server device 200.

FIG. 1 is a block diagram illustrating a schematic hardware configuration of a vehicle 100. FIG. 2 illustrates a system including a server device 200 connected to a plurality of vehicles 100 via a network N. Note that, when a specific vehicle 100 is mentioned, it is referred to as a vehicle 100A, a vehicle 100B, or the like, and when the vehicles 100 are generally mentioned, they are just referred to as the vehicles 100.

As illustrated in FIG. 1, the vehicle 100 includes a control device 110 and a communications device 120, a sensor device 130, a radar device 140, a camera device 150, a navigation device 160, a driving device 170, and an input-output device 180 that are connected to the control device 110 via a bus or the like.

The control device 110 receives predetermined signals from the devices connected thereto, performs a computing process or the like, and outputs control signals to drive the devices. The control device 110 includes a processor 110A and a memory 110B. The control device 110 can function as a driving support system according to the present embodiment by the processor 110A executing a computer program stored in the memory 110B.

The processor 110A executes a predetermined computing process in accordance with a computer program such as firmware stored in the memory 110B. The processor 110A is implemented by one or more central processing units (CPU), a micro processing unit (MPU), a GPU, a microprocessor, a processor core, a multiprocessor, an application-specific integrated circuit (ASIC), a field programmable gate array (FPGA), and so on.

The memory 110B includes a nonvolatile memory such as an MRAM, a NAND flash memory, a NOR flash memory, an SSD, or a hard disk drive, and a volatile memory such as an SRAM or a DRAM. In the nonvolatile memory, computer programs to execute various computing processes illustrated in the flowchart or the like in this disclosure, map data, and various other pieces of data necessary in this disclosure are stored. The nonvolatile memory corresponds to a non-transitory tangible medium. The volatile memory provides a working area in which a computer program loaded from the nonvolatile memory and various pieces of data generated while the processor 110A executes a computer program are temporarily stored. Note that a computer program or data acquired from the communications device 120 may be stored in the nonvolatile memory.

The communications device 120 includes means that transmits and receives information to and from an external device such as the server device 200 and includes one or more communication means such as WiFi (a wireless communication method based on the 802.11 standard defined by IEEE). The external device may be other vehicles 100 or may be infrastructure equipment provided under a road surface or in a power pole, a building, or the like. Further, the communications device 120 receives a GPS signal and outputs position information of the vehicle 100 to the control device 110.

The sensor device 130 is a sensor configured to detect the behavior of the vehicle 100 and includes a rotary encoder configured to detect the vehicle speed of the vehicle and a gyro sensor configured to detect the inclination of the vehicle. Further, the sensor device 130 may include a magnetic sensor configured to detect a marker or the like embedded in a road. The radar device 140 includes a LiDAR ranging system including a millimeter wave radar to avoid a collision with a pedestrian or the like. The camera device 150 includes a plurality of cameras including an imaging sensor such as a CCD or CMOS image sensor so as to capture images ahead of and behind the vehicle 100. The control device 110 can receive signals acquired by the sensor device 130, the radar device 140, and the camera device 150 and output a control signal based on them to a corresponding device. For example, the control device 110 can acquire an imaging signal of an image captured by the camera device 150 and execute image recognition so as to recognize an obstacle or the like included in the image thus captured, and the control device 110 can accordingly output, to the driving device 170, a control signal to stop the vehicle 100, for example. Note that the camera device 150 may be equipped with a semiconductor IC for image processing such as GPU that enables image recognition or the like, so that the camera device 150 recognizes a driving lane where the vehicle 100 should travel or an obstacle such as a pedestrian based on an image captured by a camera or the like of the camera device 150 and outputs information on the driving lane or the obstacle to the control device 110.

The navigation device 160 calculates a route to a predetermined destination based on an input from a driver or the like and performs a guidance. The navigation device 160 may include a nonvolatile memory (not shown) and store map data in the nonvolatile memory. Alternatively, the navigation device 160 may acquire map data stored in the memory 110B or may acquire map data from the communications device 120. The map data includes information on road types and information about road signs, traffic lights, and the like. Further, the map data includes position information on a specific point called a node of a facility, an address, an intersection of a road, or the like, and information corresponding to a link corresponding to a road that connects nodes to each other. The position information is indicated by latitude, longitude, and altitude, for example.

Further, a processor configured to calculate a route may be provided in the navigation device 160, but the processor 110A may execute the calculation. Further, current position information of the vehicle 100 may be acquired such that position information acquired based on a GPS signal received by the communications device 120 is acquired from the control device 110 or the navigation device 160 itself receives a GPS signal. Note that the navigation device 160 may be constituted by an information processing terminal owned by the driver or the like. In this case, the information processing terminal may be connected to the vehicle 100 by a Bluetooth (registered trademark) device or the like of the communications device 120 so that route guidance information or the like to give route guidance is output from the input-output device 180 of the vehicle 100.

The driving device 170 includes a motor and an actuator for operations of an engine, a brake, and a steering wheel of the vehicle 100 and operates based on a control signal received from the control device 110. Note that the vehicle 100 may be configured such that the control device outputs a control signal to the driving device 170 or the like based on the operations of an accelerator pedal, a brake pedal, the steering wheel, and the like by the driver or the like, but the vehicle 100 may have an automatic driving function to output, from the control device 110 to the driving device 170 or the like, a control signal to autonomously drive the vehicle 100 based on signals acquired from the radar device 140, the camera device 150, and the like. Further, the vehicle 100 may be an electric vehicle including a battery and an electric motor.

The input-output device 180 includes an input device such as a touch panel or a microphone via which the driver or the like inputs information into the vehicle 100, and sound recognition process software. The input-output device 180 is configured to receive information necessary to control the vehicle 100 based on a pressing operation on the touch panel by the driver or an utterance made by the driver. Further, the input-output device 180 includes an output device such as a liquid crystal display, a HUD, or other displays configured to output image information and one or more speakers configured to output voice information.

FIG. 2 illustrates the server device 200 of the present embodiment and many vehicles from a vehicle 100A to a vehicle 100N connected to the server device 200 via the communication network N. The server device 200 includes a processor 200A and a memory 200B. The configurations of the processor 200A and the memory 200B can be achieved by configurations similar to those of the processor 110A and the memory 110B, so detailed descriptions thereof are omitted herein. Further, computer programs to execute various computing processes, executed by the server device 200 described in this disclosure, are stored in the memory 200B.

In FIG. 2, each vehicle 100 is provided with the driving support system of the present embodiment. The communication network N may be the Internet, a LAN, a movable body communication network, Bluetooth (registered trademark), wireless fidelity (WiFi), other communication lines, or a combination of any of them. At least a part of the server device 200 may be implemented by cloud computing constituted by one or more computers. In addition, at least some of the processes in the control device 110 may be executed by the server device 200.

Figure 3:
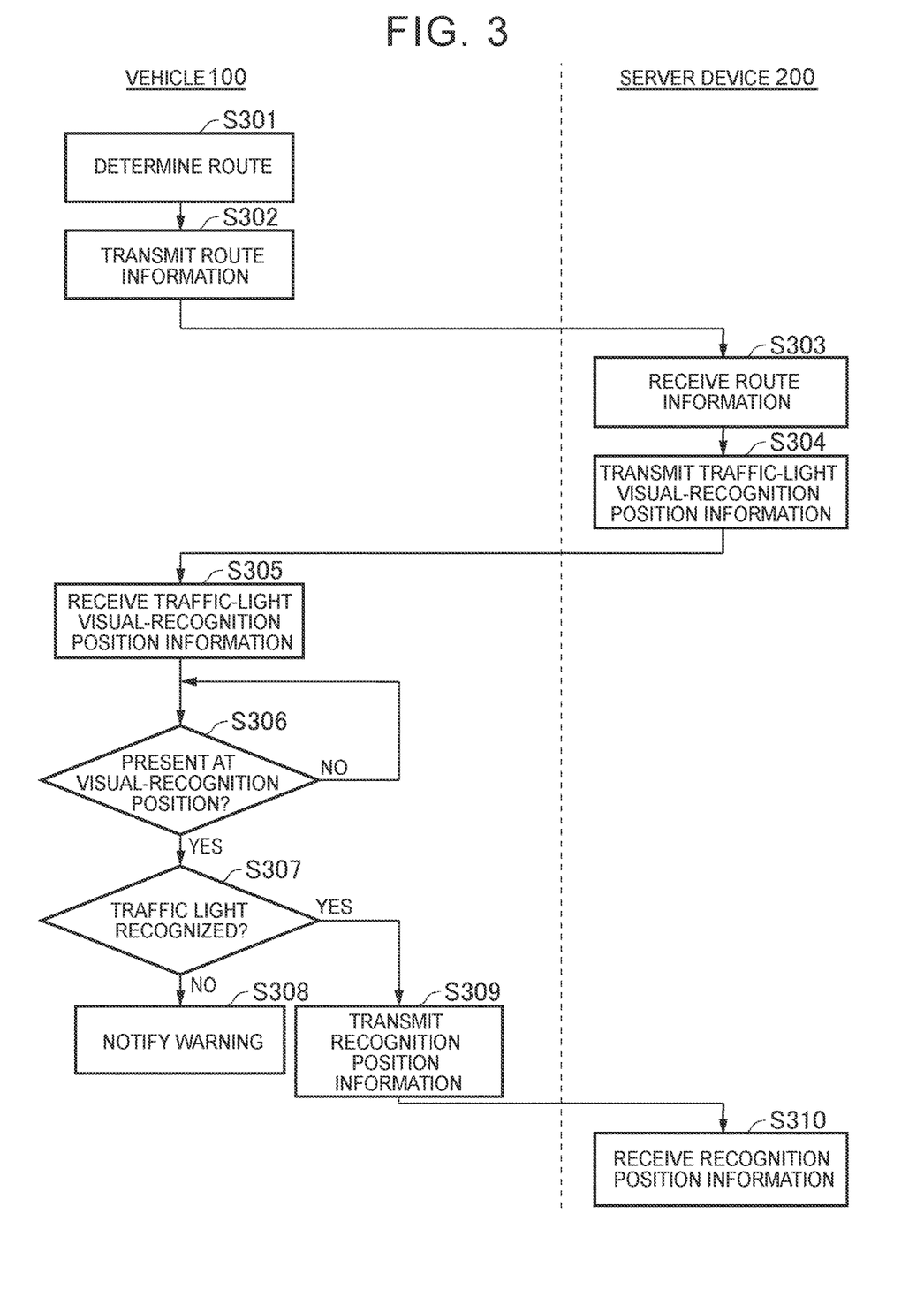
FIG. 3 is a flowchart illustrating a driving support method according to the present embodiment.

The following describes the driving support method according to the present embodiment, with reference to FIG. 3.

The navigation device 160 of the vehicle 100 calculates and determines a route from a predetermined start point to a predetermined goal point (step S301). The start point may be input by the driver or the like by use of the input-output device 180, or a current position of the vehicle 100 may be set as the start point based on the GPS signal received by the communications device 120. The navigation device 160 may calculate a plurality of candidate routes from the start point to the goal point and show the candidate routes to the driver or the like, and the driver or the like may determine the route.

When the route is determined, the control device 110 outputs route information to the server device 200 by use of the communications device 120 (step S302). The route information includes information on a plurality of links that connect nodes from a departure place to a destination.

Subsequently, the processor 200A of the server device 200 receives the route information from the vehicle 100 (step S303). In terms of a plurality of traffic lights (devices that show a signal indicative of an advance permission, a stop instruction, or the like for a vehicle on a road) present on the route for the vehicle 100, the processor 200A of the server device 200 reads, from the memory 200B, pieces of visual-recognition position information indicative of positions where the traffic lights provided on the route can be visually recognized (step S304). The processor 200A of the server device 200 stores visual-recognition position information per traffic light and per route to the traffic light in the nonvolatile memory of the memory 200B in advance. Note that the processor 200A and the memory 200B may not necessarily be placed at the same position. For example, the processor 200A may read visual-recognition position information from the memory 200B provided in an area near the route. Further, a plurality of memories 200B may be provided in a dispersed manner.

Figure 4:
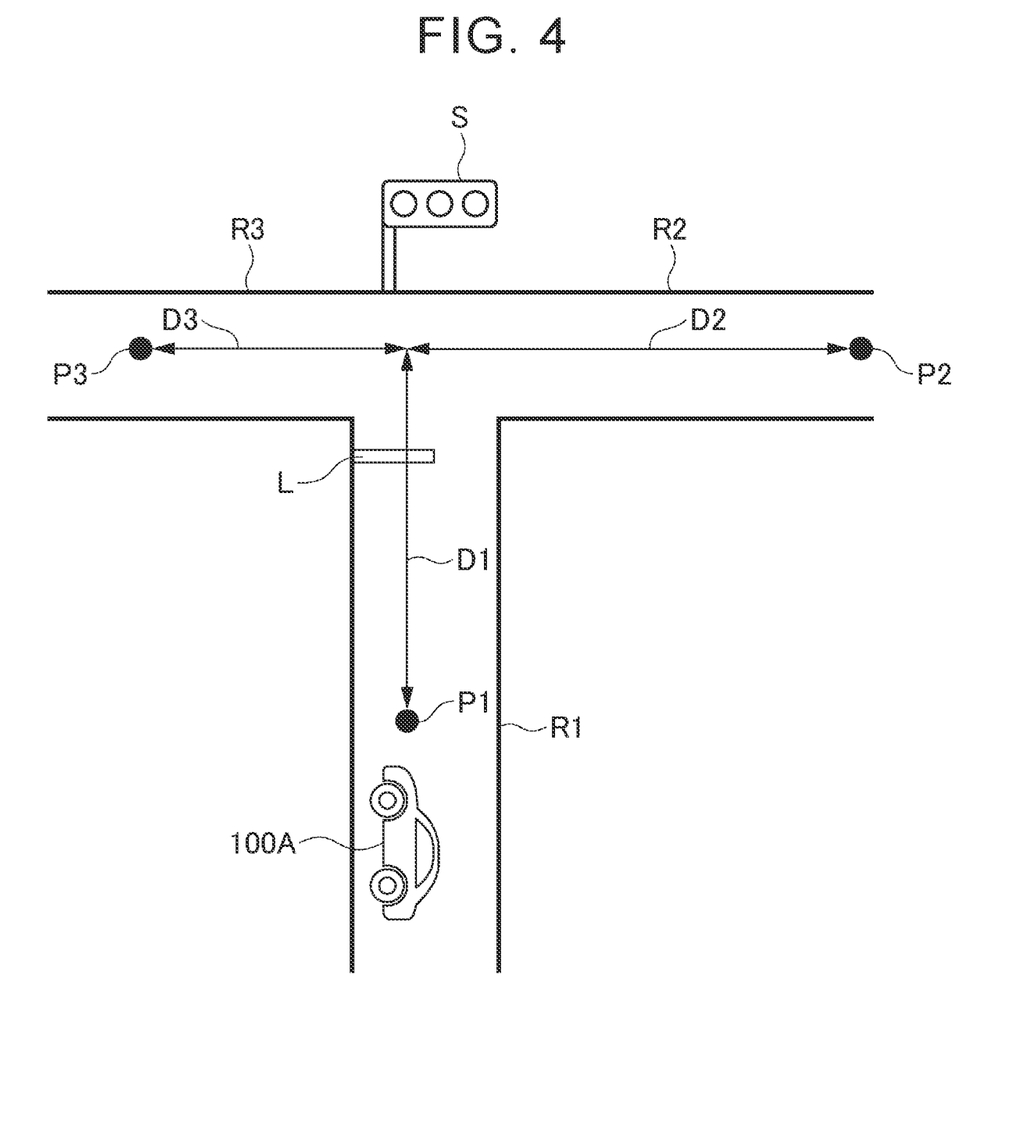
FIG. 4 is a conception diagram to describe visual-recognition position information.

FIG. 4 is a conception diagram to describe visual-recognition position information stored in the memory 200B of the server device 200. For example, in a case where a traffic light S is provided at an intersection where three routes R1 to R3 intersect with each other, when the vehicle 100A moves from the route R1 toward the intersection, a position where the driver can visually recognize the traffic light S is a position P1 distanced from a node corresponding to the intersection by a distance D1. Further, when the vehicle 100A moves from the route R2 toward the intersection, the position where the driver can visually recognize the traffic light S is a position P2 distanced from the intersection by a distance D2. When the vehicle 100A moves from the route R3 toward the intersection, the position where the driver can see the traffic light S is a position P3 distanced from the intersection by a distance D3. Even in terms of the traffic light S present at the same intersection, the position where the traffic light can be visually recognized may be different depending on the route where the vehicle 100A travels. For example, in a case where a route from the position P2 to the intersection where the traffic light S is provided is a downhill slope, the distance D2 becomes long in comparison with a case where the route is not a downhill slope. Meanwhile, in a case where a route from the position P1 to the same intersection is an uphill slope, the distance D1 becomes short in comparison with a case where the route is not an uphill slope. Further, in a case where there is a railroad bridge where trains or the like pass over the route R3, the traffic light S may be visually recognizable only when the vehicle 100A passes through the railroad bridge. In such a situation, the distance D3 may become extremely short. Note that the traffic light S is referred to a traffic light that the vehicle 100 traveling on the route should recognize visually. Because of this, even at the same intersection, a traffic light that should be recognized visually may be different depending on a route where the vehicle 100 travels.

The processor 200A of the server device 200 can determine that the vehicle 100A approaches the intersection where the traffic light S is provided from the route R1 among the route R1 to the route R3, for example, based on route information received from the vehicle 100A. Accordingly, the processor 200A of the server device 200 can transmit, to the vehicle 100A, information including latitude and longitude information of the position P1 as visual-recognition position information indicative of a position where the traffic light S is visually recognizable. Note that the visual-recognition position information is not limited only to the information indicative of the position P1 such as the latitude and longitude information of the position P1. For example, information indicative of one or more links included between the position P1 and the node of the intersection may be transmitted as the visual-recognition position information. Further, information indicative of the distance D1 based on the node of the intersection may be transmitted as the visual-recognition position information.

Thus, the processor 200A of the server device 200 transmits, to the vehicle 100A, a plurality of pieces of visual-recognition position information corresponding to a plurality of traffic lights through which the vehicle 100A is to pass. The control device 110 causes the communications device 120 to receive, from the server device 200, the pieces of visual-recognition position information corresponding to the traffic lights provided on the route (step S305) and stores the pieces of visual-recognition position information in the memory 110B.

After that, the vehicle 100A starts traveling. During the traveling, the camera device 150 takes a forward image ahead of the vehicle 100A at a predetermined cycle and outputs it to the control device 110. The control device 110 recognizes a traffic light by use of a technique such as image recognition from the forward image thus received. Accordingly, the control device 110 of the vehicle 100A can repeatedly execute a step of determining whether a traffic light is present or not, based on the forward image at the predetermined cycle. Note that the presence of a pedestrian, an obstacle, or the like other than a traffic light can be also recognized in a similar manner, and a control signal can be output to the driving device 170 as needed. For example, in a case where the control device 110 recognizes the presence of a pedestrian ahead of the vehicle based on a forward image taken by the camera device 150, the control device 110 can output a control signal to stop the vehicle 100A to the driving device 170. Note that the camera device 150 may acquire a moving image as the forward image. Further, the camera device 150 may include GPU or the like for image recognition, so that the camera device 150 can recognize a traffic light or the like. Further, the vehicle 100A does not need to always recognize a traffic light or the like and may be configured to recognize a traffic light or the like only in a predetermined case.

The control device 110 is configured to cyclically determine whether the vehicle 100A is placed at a visual-recognition position or not, while the vehicle 100A is traveling (step S306). In a case where latitude and longitude information of a position where a traffic light is visually recognizable is received as the visual-recognition position information, when the vehicle 100A is present between this position and a position of a node of a corresponding intersection or a position sufficiently close to the node of the corresponding intersection (e.g., several meters before the intersection), it is determined that the vehicle 100A is placed at the visual-recognition position. In a case where link information is received as the visual-recognition position information, the control device 110 determines whether the vehicle 100A is present at the visual-recognition position or not, based on whether the vehicle 100A travels on the link or not.

When it is determined that the vehicle 100A is present at the visual-recognition position in step S306, the control device 110 determines whether the traffic light is recognized from a forward image or not (step S307).

Figure 5A:
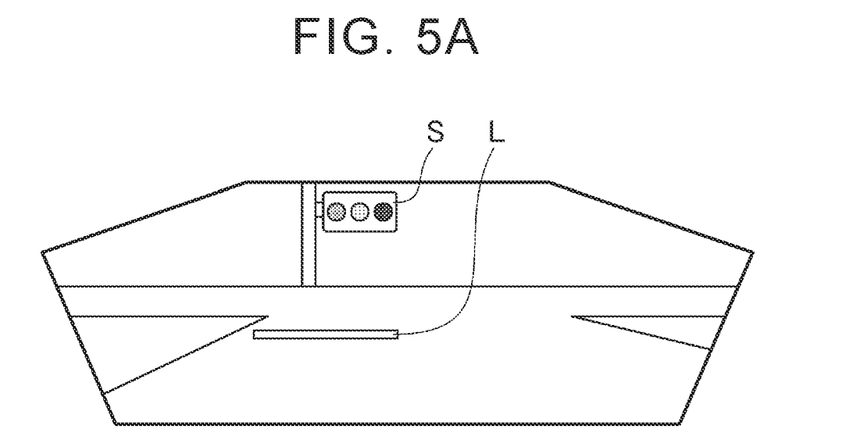
FIG. 5A is a schematic view of a forward image.
Figure 5B:
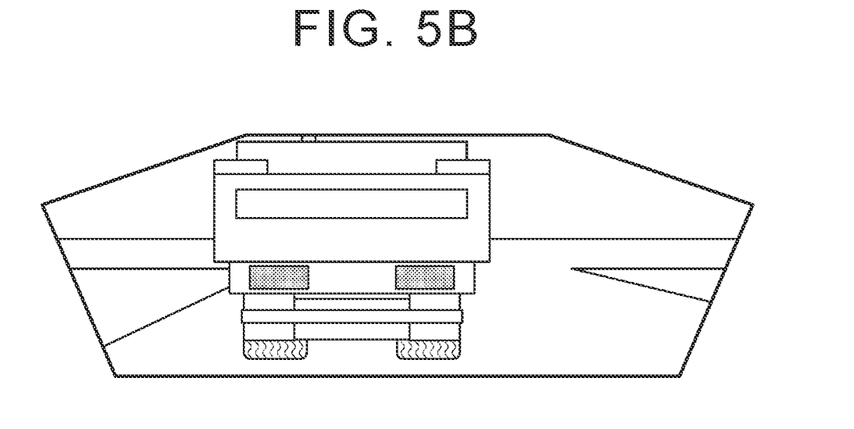
FIG. 5B is a schematic view of a forward image.

FIGS. 5A and 5B are views schematically illustrating forward images ahead of the vehicle 100A, taken by the camera device 150. In a case where other vehicles or the like are not present ahead of the vehicle 100A as illustrated in FIG. 5A, the driver can visually recognize the traffic light S and a stop-line L. Similarly, the control device 110 can recognize the traffic light S and the stop-line L from the forward image. Meanwhile, in a case where a large-size vehicle is present ahead of the vehicle 100A as illustrated in FIG. 5B, the field of view is blocked by the large-size vehicle, so that the driver and the control device 110 cannot recognize the traffic light S and the stop-line L from the forward image. On this account, the driver falls into such a state that, although the traffic light S is present ahead of the vehicle 100A, the driver does not recognize the presence of the traffic light S. In such a state, in a case where the traffic light S changes from yellow light to red light and the large-size vehicle passes through the intersection in a last-minute timing, for example, the driver of the vehicle 100A might follow the large-size vehicle and attempt to pass through the intersection though the traffic light S is changing to red.

However, in a case where the traffic light is not recognized from the forward image though the vehicle 100A is present at a position where the traffic light is visually recognizable, the control device 110 of the vehicle 100A provided with the driving support system of the present embodiment is configured to output, to the input-output device 180, a control signal to warn the driver or the like that the traffic light is present (step S308). As a tendency, more specifically, the input-output device 180 may be caused to output a voice message indicative of the presence of the traffic light, e.g., "There is a traffic light. Please be careful." Alternatively, a text indicative of the presence of the traffic light or an illustration of the traffic light may be displayed on the HUD. Alternatively, a warning sound to promote attention may be just output.

Meanwhile, when the traffic light is recognized in step S307, the control device 110 transmits, to the server device 200, position information of a position where the traffic light is recognized (step S309). In this case, the control device 110 does not cause the input-output device 180 to notify the driver or the like of the warning indicating that the traffic light is present.

The processor 200A of the server device 200 receives, from the vehicle 100A, the position information of the position where the traffic light is recognized (step S310) and stores the position information in the memory 200B. Similarly, the processor 200A of the server device 200 can receive, from a plurality of vehicles 100, pieces of recognition position information indicative of a position where a predetermined traffic light is recognized. The processor 200A of the server device 200 can determine traffic-light visual-recognition position information based on these pieces of recognition position information and store the traffic-light visual-recognition position information in the memory 200B.

After the warning is notified in step S308, or after the recognition position information indicative of the position where the traffic light is recognized is transmitted in step S309, when the vehicle 100A passes through the traffic light S, the process returns to step S306 again. Accordingly, when the vehicle 100A approaches a next traffic light, the process after step S306 is repeated.

Note that, in step S307, when it is determined that the control device 110 recognizes the traffic light a predetermined number of times or more or for a predetermined period of time or more, it may be determined that the traffic light is recognized, and when the control device 110 recognizes the traffic light only for an instant, it may be determined that the traffic light is not recognized.

Further, the control device 110 may be configured to execute step S306 only when the vehicle 100A approaches a target traffic light by a predetermined distance or less. For example, there is such a case where a traffic light placed 200 meters ahead of the vehicle 100A may be visually recognizable in a straight road with a good view. In such a case, the control device 110 may be configured to execute step S306 when the vehicle 100A approaches the target traffic light by 50 meters or less, for example.

With such a configuration, it is possible to limit a traffic light targeted for the process only to a neighboring traffic light with a high necessity for safe driving.

Note that, instead of the above configuration, in step S304, in a case where the vehicle 100A is distanced by a predetermined distance or more from a position where a traffic light is visually recognizable, the server device 200 may transmit, as visual-recognition position information about the traffic light, information just indicating that the vehicle 100A is distanced from the traffic light by the predetermined distance or more or information indicating that the traffic light is visually recognizable from a sufficiently distant place. With such a configuration, the amount of information stored in the server device 200 and transmitted to the vehicle 100 can be reduced.

Further, there is such a case where a plurality of traffic lights may be visually recognizable. For example, there is such a case where a traffic light close to the vehicle 100A and a traffic light far from the vehicle 100A may be both visually recognizable in a straight road with a good view. In such a case, the control device 110 can target only the traffic light close to the vehicle 100A for the determination in step S307. More specifically, the sizes and the like of the traffic lights are determined based on the number of pixels or the like by image recognition or the like, so that the traffic light in a distant place can be excluded from the target for determination. When only the traffic light within a predetermined distance or less from the vehicle 100A is targeted for the process in step S307 by employing such a configuration, it is possible to reduce such a possibility that warning is not notified because the traffic signal in a distance place is recognized without visually recognizing the traffic light close to the vehicle 100A due to a large-size vehicle or the like ahead of the vehicle 100A or due to a winding road.

With the driving support system described above, in a case where a traffic light that should be visually recognizable originally is not visually recognized, it is possible to accurately notify the driver or the like of the presence of the traffic light.

Further, in step S310, the processor 200A of the server device 200 receives position information of a position where a traffic light is recognized, from the vehicle 100 that actually recognizes the traffic light. Accordingly, it is possible to acquire accurate traffic-light visual-recognition position information based on the position information. For example, the processor 200A of the server device 200 can acquire visual-recognition position information in consideration of the change of a road in height or the like. By updating the visual-recognition position information based on recognition position information acquired newly in terms of time, it is possible to acquire more accurate visual-recognition position information. For example, it is possible to acquire, as a visual-recognition position, a point where a traffic light becomes visually recognizable because a building or the like that disturbed visual recognition of the traffic light before is demolished. Conversely, it is possible to prevent such a situation that a point where visual recognition of a traffic light is disturbed by a building or the like newly built is wrongly acquired as a visual-recognition position. This makes it possible to increase the accuracy of warning to be notified. Further, in a case where a traffic light is recognized, it is preferable not to notify that the traffic light is recognized. With such a configuration, it is possible to reduce the frequency of notification, thereby making it possible to restrain such a situation that the driver disregards the notification of warning in step S308. However, this does not prevent such a configuration that the driver or the like sets the notification of warning to be performed even when a traffic light is recognized, for example.

Note that it is preferable for the processor 200A of the server device 200 to acquire statistically accurate visual-recognition position information based on pieces of recognition position information acquired from many vehicles 100. Further, identification information indicative of a vehicle type of the vehicle 100 may be received in step S302 and S310, and different visual-recognition position information may be output to the vehicle 100 depending on the vehicle type in step S304. For example, the recognition position information received in step S310 may be associated with information indicative of the vehicle type or the vehicle height of the vehicle 100 and stored in the memory 200B, and based on identification information indicative of the vehicle type of the vehicle 100 that is received in step S302, recognition position information corresponding to the vehicle height or the vehicle type may be transmitted to the vehicle 100 in step S304. Alternatively, visual-recognition position information corrected in consideration of the vehicle height or the like may be acquired. For example, in a case of a trailer bus or the like illustrated as the vehicle 100B in FIG. 2, a driver seat or the like as well as the vehicle height is also different from that in a normal passenger car. Accordingly, the server device 200 may store recognition position information of the same vehicle type as the vehicle 100B in association with the vehicle type of the vehicle 100B and transmit, to the vehicle 100B, visual-recognition position information based on one or more pieces of recognition position information acquired from the same vehicle type. However, a position where the driver can view a traffic light by visual inspection or the like may be acquired at first as the visual-recognition position information. Further, the height of the viewpoint of the driver may be calculated with a camera that captures an image of the driver, and a visual-recognition position may be corrected.

Second Embodiment

In the first embodiment, the vehicle 100 receives, from the server device 200, specific position information indicative of a position where a traffic light is visually recognizable. However, like the second embodiment described below, when the vehicle 100 enters a region where a traffic light is visually recognizable, the server device 200 may output, to the vehicle 100, information indicating that the vehicle 100 has entered a position where the traffic light is visually recognizable. Note that, in the following description, descriptions are omitted or simplified in terms of parts overlapping with the first embodiment. Further, except for a peculiar process to be described in the second embodiment, constituent components that perform processes similar to the processes in the first embodiment have the same reference signs as in the first embodiment, and detail descriptions thereof are omitted.

In the second embodiment, the server device 200 is provided in a facility around the traffic light S. Note that the server device 200 may be buried under a road surface around the traffic light S. Similarly to the first embodiment, the processor 200A of the server device 200 acquires pieces of recognition position information of the traffic light S from the vehicles 100 traveling through an intersection where the traffic light S is present, acquires statistically accurate visual-recognition position information based on the pieces of recognition position information, and stores it in the memory 200B.

Figure 6:
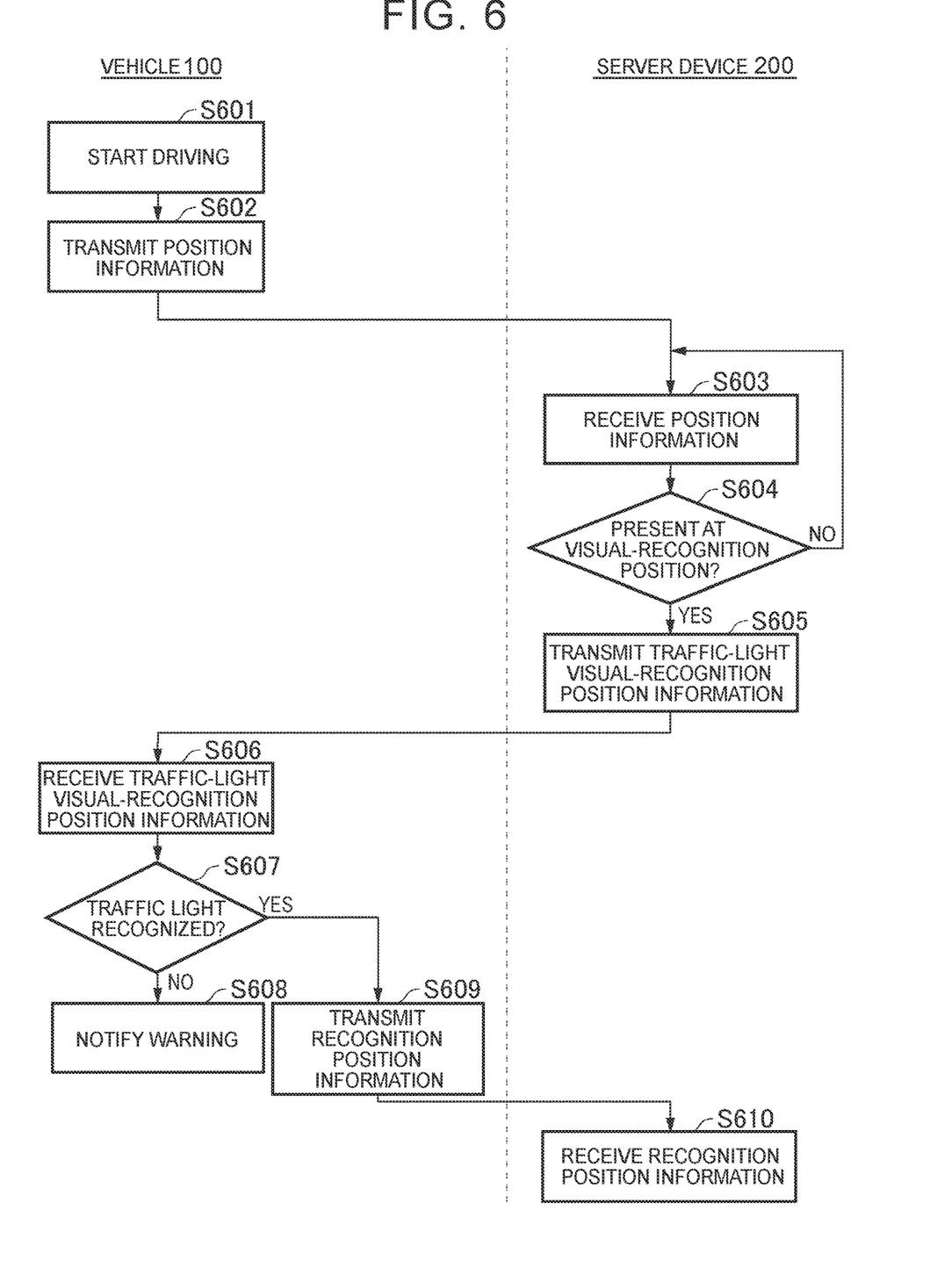
FIG. 6 is a flowchart illustrating a driving support method according to a second embodiment.

In the second embodiment, the vehicle 100 is configured to acquire the visual-recognition position information from the server device 200 during traveling. More specifically, when the vehicle 100 approaches a predetermined intersection after the vehicle 100 starts traveling (step S601), the vehicle 100 transmits its own position information to the server device 200 directly or indirectly (step S602). When the processor 200A of the server device 200 receives the position information from the vehicle 100 (step S603), the processor 200A reads out visual-recognition position information stored in the memory 200B and compares it with the position information received from the vehicle 100, so as to determine whether the vehicle 100 enters a visual-recognition position in a route where the vehicle 100 is traveling (step S604). When it is determined that the vehicle 100 has entered the visual-recognition position, the server device 200 transmits, to the vehicle 100, information indicating that the vehicle 100 has entered a position where the traffic light is visually recognizable (step S605). This information may be information of one bit.

When the control device 110 of the vehicle 100 receives information from the server device 200, the control device 110 determines that the vehicle 100 is placed at the position where the traffic light is visually recognizable, and the control device 110 determines whether the traffic light is recognized or not from a forward image (step S607). Steps S607 to S610 are similar to steps S307 to S310, and therefore, detailed descriptions thereof are omitted.

As described above, a protocol is set in advance such that, when the vehicle 100 and the server device 200 receive a predetermined signal, it can be determined that the vehicle 100 is placed at the visual-recognition position where the traffic light is visually recognizable. With such a configuration, it is also possible to accurately notify the driver or the like in a case where the traffic light that should be visually recognizable originally is not visually recognized, similarly to the first embodiment.

Further, the amount of information received from the server device 200 can be also reduced. Note that pieces of traffic-light position information on a plurality of traffic lights around the vehicle 100 may be received from the server device 200. In this case, the vehicle 100 may be configured to execute a step of determining whether the vehicle 100 is placed at the visual-recognition position, similarly to the first embodiment.

Note that embodiments of the present disclosure can be modified variously without deviating from the gist of the present disclosure. For example, within a range of normal creativity of a person skilled in the art, some constituents in a given embodiment or modification can be added to other embodiments. Further, some constituents in a given embodiment or modification can be substituted with corresponding constituents in other embodiments.

MODIFICATIONS

The first embodiment and the second embodiment deal with the driving support system targeted for a traffic light. However, the present disclosure can be also applied to a road sign instead of the traffic light. Here, a road sign is a display board provided besides a road or an air space above the road so as to provide information necessary for a user. Even in the case of such a road sign, the size and the shape of the road sign are defined, similarly to the traffic light, so that it is possible to recognize the road sign with accuracy by the control device 110. Further, an adverse effect caused when a traffic light that should be visually recognizable originally is not visually recognized is not small. For example, in addition to the traffic light, the present disclosure can be applied to a road sign indicative of a guidance in an express highway or the like.

What is claimed is:

1. A driving support system comprising:
one or more processors mounted on a vehicle, the one or more processors programmed to:
acquire visual-recognition position information from an external server that corrects the visual-recognition position information, the visual-recognition position information including information of a vehicle type of a vehicle, the external server correcting the visual-recognition position information based on the vehicle type of the vehicle; and
determine whether the vehicle is present at a position where a driver of the vehicle is assumed to be able to visually recognize a traffic light, the position where the driver is assumed to be able to visually recognize the traffic light depending on the visual-recognition position information; and
a camera configured to acquire a forward image ahead of the vehicle,
wherein the one or more processors are further configured to recognize a traffic light included in the forward image, and
wherein the one or more processors are further programmed to, when it is determined that the vehicle is present at the position where the driver of the vehicle is assumed to be able to visually recognize the traffic light and the traffic light is not recognized from the forward image, transmit a warning notification to a driver of the vehicle.

2. The driving support system according to claim 1, further comprising:
an output portion configured to output, to an outer part, route information on a route where the vehicle is planned to travel; and
wherein the one or more processors are further programmed to acquire pieces of visual-recognition position information of a plurality of traffic lights on the route indicated by the route information.

3. The driving support system according to claim 1, further comprising a second output portion configured to output, to an outer part, position information on a position of the vehicle where the traffic light is recognized.

4. A driving support system comprising:
one or more processors mounted on a vehicle, the one or more processors programmed to:
acquire visual-recognition position information from an external server that corrects the visual-recognition position information, the visual-recognition position information including information of a vehicle type of a vehicle, the external server correcting the visual-recognition position information based on the vehicle type of the vehicle; and
determine whether the vehicle is present at a position where a driver of the vehicle is assumed to be able to visually recognize a road sign, the position where the driver is assumed to be able to visually recognize the road sign depending on the visual-recognition position information; and
a camera configured to acquire a forward image ahead of the vehicle wherein the one or more processors are further configured to:
recognize the road sign included in the forward image, and
when it is determined that the vehicle is present at the position where the driver of the vehicle is assumed to be able to visually recognize the road sign and the road sign is not recognized from the forward image, transmit a warning notification to a driver of the vehicle.

* * * * *